United States Patent
Altmann et al.

(10) Patent No.: US 10,051,309 B2
(45) Date of Patent: Aug. 14, 2018

(54) PORT PROCESSOR CAPABLE OF PERFORMING AUTHENTICATION FOR MULTIPLE SOURCE DEVICES

(71) Applicant: Lattice Semiconductor Corporation, Portland, OR (US)

(72) Inventors: William Conrad Altmann, San Jose, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 548 days.

(21) Appl. No.: 14/676,695

(22) Filed: Apr. 1, 2015

(65) Prior Publication Data

US 2016/0295221 A1    Oct. 6, 2016

(51) Int. Cl.
H04N 21/426 (2011.01)

(52) U.S. Cl.
CPC ............................ H04N 21/42623 (2013.01)

(58) Field of Classification Search
CPC .................... H04N 21/42623; H04N 19/117
See application file for complete search history.

(56) References Cited

U.S. PATENT DOCUMENTS

| 8,374,346 B2 | 2/2013 | Choi et al. | |
| 2002/0097869 A1* | 7/2002 | Pasqualino | H03L 7/085 380/200 |
| 2010/0177892 A1* | 7/2010 | Choi | H04N 7/163 380/201 |
| 2016/0156950 A1* | 6/2016 | Bangma | H04N 21/4263 725/116 |

* cited by examiner

Primary Examiner — William C Vaughn, Jr.
Assistant Examiner — Jerry Jean Baptiste
(74) Attorney, Agent, or Firm — Fenwick & West LLP

(57) ABSTRACT

Embodiments relate to sending vertical synchronization data for a plurality of data streams in a selected data stream to perform authentication operations for the plurality of data stream. A port processor receives data streams from a plurality of transmitting devices. After receiving the data streams, the port processor selects one of the data streams for transmission to a decrypting device. The port processor extracts vertical synchronization data from the unselected data streams and inserts the extracted vertical synchronization data into the selected data stream to form a modified data stream. The port processor sends the modified data stream to a decrypting device. The decrypting device has at least one processing engine. The port processor discards the unselected data streams without sending the unselected data streams to the decrypting device.

21 Claims, 6 Drawing Sheets

PORT PROCESSOR CAPABLE OF PERFORMING AUTHENTICATION FOR MULTIPLE SOURCE DEVICES

BACKGROUND

1. Field of the Disclosure

This disclosure pertains in general to data communications, and more specifically to managing multiple input ports using a single signaling path and a control path.

2. Description of the Related Art

High-bandwidth Digital Content Protection (HDCP) is a specification designed to protect digital content across various interfaces. A typical HDCP configuration includes HDCP transmitting devices (i.e., DVD player, HD DVD player, Blu-Ray player, computer video cards, etc.) and a HDCP sink device (i.e., television, monitor, etc.). An encrypted data stream is transmitted from the HDCP transmitting devices to the HDCP sink device. Before transmitting the data streams, the HDCP transmitting device authenticates with the HDCP sink device.

As one example application, HDCP is used to encrypt data streams from the HDCP transmitting devices. An HDCP version 2.2 (HDCP 2.2) sink device may include multiple input ports, each connected to a transmitting device. The HDCP sink device can decrypt an HDCP2.2 encrypted stream from the transmitting devices, but it does so by synchronizing with each of the HDCP transmitting devices using separate HDCP decrypting engines for each transmitting device. Hence, to operate with multiple transmitting devices, the HDCP sink device a corresponding number of Advanced Encryption Standard (AES) engines, which is expensive to implement.

SUMMARY

Embodiments relate to sending vertical synchronization data for a plurality of data streams in a selected data stream to perform authentication operations for the plurality of data stream. A port processor receives data streams from a plurality of transmitting devices. After receiving the data streams, the port processor selects one of the data streams for transmission to a decrypting device. The port processor extracts vertical synchronization data from the unselected data streams and inserts the extracted vertical synchronization data into the selected data stream to form a modified data stream. The port processor sends the modified data stream to a decrypting device. The decrypting device has at least one processing engine. The port processor discards the unselected data streams without sending the unselected data streams to the decrypting device.

In one embodiment, the port processor extracts encryption data from the unselected data streams and inserts the encryption data into the selected data stream to form the modified data stream. The encryption data indicates whether the data in the unselected data streams is encrypted.

In one embodiment, the encryption data includes a control signal for performing Enhanced Encryption Status Signaling (EESS) in Mobile High Definition Link (MHL) or High-Definition Multimedia Interface (HDMI) standard.

In one embodiment, the vertical synchronization data and the encryption data are inserted into the control periods of the selected data stream to generate the modified data stream.

In one embodiment, the port processor authenticates the decrypting device with each of the corresponding transmitting devices by sending authentication data from the decrypting device to the corresponding transmitting devices.

In one embodiment, the authentication is compliant with the High-bandwidth Digital Content Protection (HDCP) standard.

In one embodiment, the port processor receives residual key values of the data streams from the decrypting device and routes the residual key values to each of the corresponding transmitting devices.

In one embodiment, the port processor selects a data stream according to a selection signal received by the port processor.

Embodiments also relate to maintaining authentication with a plurality of transmitting devices and a decrypting device without the decrypting device receiving data streams from all of the transmitting devices. The decrypting device receives a modified stream from the port processor. The modified stream including a first data stream and vertical synchronization data for the first data stream, and vertical synchronization data for a second data stream. After receiving the modified data stream, the decryption engine extracts and removes the vertical synchronization data for the second data stream to generate the first data stream. The decrypting device processes the first data stream by decrypting the first data stream based on the vertical synchronization data for the first data stream. The decrypting device uses a link engine to process the extracted vertical synchronization data to maintain authentication with a second transmitting device sending the second data stream.

In one embodiment, the modified stream does not include content of the second data stream and the link engine does not receive or decrypt the second data stream.

In one embodiment, the decrypting device extracts and removes encryption data second data stream from the modified stream to generate the first data stream.

In one embodiment, the decrypting device authenticates with a first transmitting device by sending first authentication data to the first transmitting device via the port processor. The decrypting device also authenticates with the second transmitting device by sending second authentication data to the second transmitting device via the port processor.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It is noted that wherever practicable similar or like reference numbers may be used in the figures may indicate similar or like functionality. Alternative embodiments of the structures and methods disclosed herein will be readily recognized as viable alternatives that may be employed without departing from the principles discussed herein. Reference will now be made in detail to several embodiments, examples of which are illustrated in the accompanying figures.

Embodiments relate to maintaining authentication with a plurality of transmitting devices at a decrypting device without routing data streams from each of the transmitting devices to the decrypting device. A port processor receives data streams from a plurality of transmitting devices. After receiving the data streams, the port processor selects one of the data streams for transmission to the decrypting device. The port processor then extracts and inserts vertical synchronization data from the unselected data streams into the selected data stream to form a modified data stream for sending to the decrypting device. The decrypting device extracts vertical synchronization data corresponding to the unselected data streams to perform authentication operation while decrypting the selected data stream generated from the modified data stream by removing the vertical synchronization data for the unselected data streams inserted by the port processor.

A data stream described herein refers to a sequence of data frames where each data frame includes control data and one or more of video data, audio data and auxiliary data.

A modified data stream described herein refers to a sequence of modified data frames, each modified data frame including control data from a plurality of data frames and one or more of video data, audio data and auxiliary data from a selected data frame.

The following embodiments are described primarily using High-bandwidth Digital Content Protection (HDCP) 2.2 in the context of Mobile High-Definition Link (MHL) as an example. However, other authentication schemes and media transmission schemes may also use the principles of the disclosure described herein.

Figure 1:
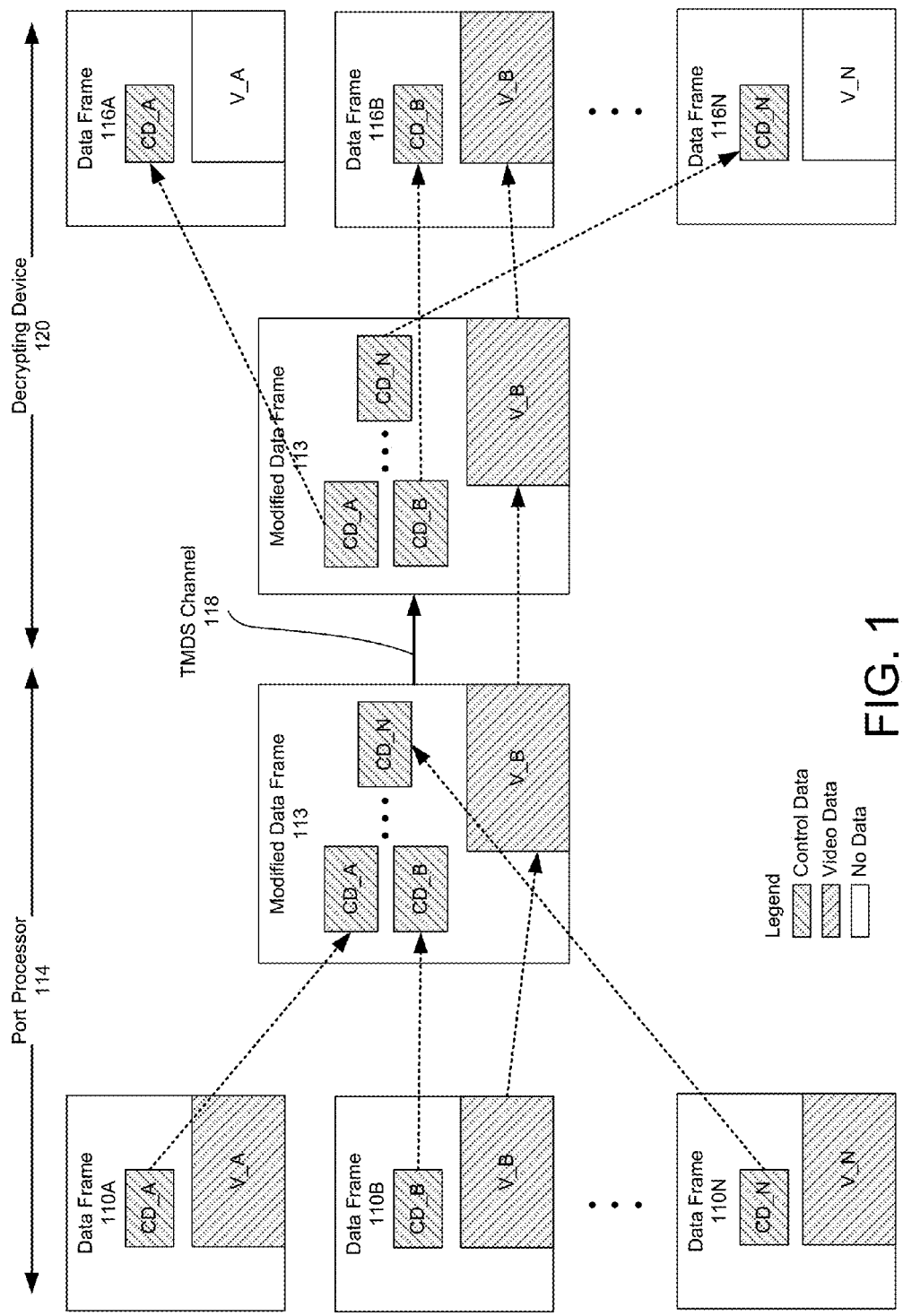
FIG. 1 is a conceptual diagram illustrating modification of data frames for transmission between a port processor and a decrypting device, according to one embodiment.

FIG. 1 is a conceptual diagram illustrating modification of data frames for transmission between port processor 114 and decrypting device 120, according to one embodiment. Port processor 114 receives data frames 110A through 110N (hereinafter collectively referred to as "data frames 110") from different transmitting devices (not shown), generates modified data frame 113 combining control data from each of the data frames 110 and one or more of video data, audio data (not shown) and auxiliary data (not shown) from a selected data frame from the data frames 110, and sends modified data frame 113 to decryption device 120 over a data channel (e.g., transition-minimized differential signaling (TMDS) channel 118).

Examples of transmitting devices include DVD players, HD DVD players, Blu-Ray players, and computer video cards. Examples of device 200 include receivers, televisions, and monitors.

Transition-minimized differential signaling (TMDS) is a technology for transmitting high-speed serial data and is often used by communication interfaces such as High Definition Multimedia Interface (HDMI) video interfaces and MHL video interfaces. When used in HDMI, three TMDS twisted pairs are used to transfer video data. A twisted pairs refers to a type of wiring in which two conductors, or wires, are twisted together to cancel electromagnetic interference from external sources.

Each of the data frames 110A through 110N received from the transmitting devices includes control data CD_A through CD_N and video data V_A through V_N, respectively. Specifically, data frame 110A includes CD_A and V_A, data frame 110B includes CD_B and V_B, and data frame 110N includes CD_N and V_N. Data frame 110A through 110N (hereinafter collectively referred to as "data frames 110") include one or more of video data, audio data (not shown) and auxiliary data (not shown). Port processor 114 includes, in the modified data frame 113, only video data (e.g., V_B), audio data (not shown) and auxiliary data (not shown) of a selected data frame, but the control data CD_A through CD_N of all of the data frames 110. The modified data frame 113 is sent over the TMDS channel 118.

Control data is used by a sink device (e.g. device 200) for data synchronization with a source device (e.g., transmitting device 210B). Control data indicates whether the upcoming data is a video data, audio data or auxiliary data. Control data is unencrypted; however, video data, audio data and auxiliary data can be encrypted. The video data includes pixel information about a data frame (e.g., data frame 110) and the data island includes audio data and auxiliary data corresponding to the data frame. Audio data includes frequency and amplitude information corresponding to the data frame. Auxiliary data includes data, such as information frames, describing the active video data or audio data. Control data includes horizontal synchronization (HSYNC) data, vertical synchronization (VSYNC) data, and encryption data. HSYNC and VSYNC data include position, polarity, and duration information. HSYNC data signals the beginning of each new video line and VSYNC data signals to a display (not shown) to perform a vertical retrace and prepare to scan the next data frame. In one example, synchronization signals are used to maintain authentication between the source device and the sink device.

Encryption data indicates whether a frame is encrypted. In one example, encryption data is used by HDCP engines (e.g., HDCP decrypt engine 224 and HDCP link engine 226A through 226M) to decrypt the synchronization signals to maintain authentication between the source device and the sink device. One example of implementing encryption data is through Enhanced Encryption Status Signaling (EESS). EESS is a protocol for signaling whether encryption is enabled or disabled for a frame. EESS is used with the HDMI standard and MHL standard, but is an optional feature with the Digital Visual Interface (DVI) standard. The EESS protocol is used after the sink device is authenticated with a respective source device. In one embodiment, the EESS protocol uses previously reserved control signals CTL3, CTL2, CTL1, and CTL0 (hereinafter collectively referred to as "CTLx") of the HDCP-protected Interface. Table 1 shows a table of two sets of EESS control signals and corresponding description.

TABLE 1

| CTL3 | CTL2 | CTL1 | CLT0 | Description |
|------|------|------|------|-------------|
| 1 | 0 | 0 | 1 | Encryption is enabled for the frame |
| 0 | 0 | 0 | 1 | Encryption is disabled for the frame |

In one embodiment, only control data CTL3 of the EESS protocol is used for signaling whether encryption is enabled or disabled for the frame. Using only CTL3 is advantageous, among other reasons, because CTL2, CTL1 and CTL0 are the same regardless of where the encryption is enabled and disabled. In this embodiment, only 1 bit of data is monitored, instead of 4 bits of data as is the case in the traditional EESS case.

An HDCP engine generally refers to a logic block that encrypts or decrypts a data stream. An HDCP engine may be implemented using hardware components, computer programs, or a combination thereof. For example, a source device (e.g., transmitting device 210A) may have an HDCP engine for encryption, while a sink device (e.g., device 200) may have an HDCP engine for decryption. HDCP engines are also used to pre-authenticate the source device and the sink device to establish a secure link between the two. HDCP engines are also used to maintain authentication between the source device and the sink device. A control bus (e.g., control bus 246) is used for pre-authentication and maintaining authentication. In one example, the control bus is an I2C (DDC) bus. HDCP engines are employed as examples of content protection and decipher processing engines for the sake of consistency, brevity, and clarity. Other forms of engines consistent with the HDCP technology can also be employed to perform the techniques and embodiments disclosed.

Pre-authentication described herein refers to performing the necessary HDCP authentication before switching to a port (e.g., port 232A), instead of after switching. Pre-authentication reduces delays associated with authentication by associating HDCP authentication with background operations, instead of foreground operations.

With regard to HDCP authentication, in general, the HDCP engine in the sink device receives two pieces of information to stay synchronized with the source: (1) information indicating where the frame boundaries are for the frames in the data stream received from the transmitting device, and (2) information indicating which of the frames contains a signal indicating that the frame is encrypted. In one example, the EESS protocol is used to indicate that the frame is encrypted.

To maintain authentication, the source device periodically checks the sink device with a residue of the key (Ri value). The residual of the key refers to value of a shared key between the source device and the sink device that is updated at every frame. At every $128^{th}$ frame in the stream, the source device and the sink device exchange a residue of the key and check the authentication of the link (called Ri checking in HDCP).

Referring back to FIG. 1, decrypting device 120 receives modified data frame 113 from port processor 114 over a data channel, extracts and stores the control data in data frame 116A through 116N (hereinafter collectively referred to as "data frames 116"). Specifically, decrypting device 120 extracts control data CD_A from the modified data stream 113 and stores it in data frame 116A. Similarly, control data CD_B through CD_N is extracted and stored in data frame 116B through 116N, respectively. One or more of the video data (e.g., V_B), the audio data (not shown) and the auxiliary data (not shown) of the selected data frame (i.e., data frame 110B) is extracted and stored in the data frame 116B, which also stores the corresponding control data (i.e., CD_B).

By sending one or more of video data (e.g., V_B), audio data and auxiliary data from a selected data frame (e.g., data frame 110B) along with the control data for all the data frames (e.g. CD_A through CD_N from data frames 110), one or more of video data, audio data and auxiliary data from unselected data frames (e.g. V_A through V_N, not including V_B) can be discarded. By discarding the unselected data frames, port processor 114 can use a single data channel (e.g., TMDS channel 118) to transmit data to decrypting device 120. Further, port processor 114 routes the modified data frame 113 to the decrypting device 120 without decrypting data frames 110.

Decryption requires using Advance Encryption Standard (AES) engines. Since decryption is performed at decrypting device 120 and not at port processor 114, port processor 114 does not include any AES engines. Not including AES engines in port processor 114 allows for port processor 114 and decrypting device 120 to be manufactured using different semiconductor fabrication techniques. Port process 114 may be manufactured using a semiconductor fabrication process and package designed for analog processing, where the fabrication process uses a larger critical size. On the other hand, decrypting device 120 may be manufactured using a semiconductor fabrication process and package designed for digital processing, where the fabrication process uses a smaller critical dimension. By using different semiconductor fabrication processes for the port processor 114 and the decrypting device 120, the port processor 114 and the decrypting device 120 can be produced in a more cost-effective manner compared to producing a single chip with both functionality by using a single semiconductor fabrication process involving a smaller critical size. The port processor 114 can be manufactured on a first chip and the decrypting device 120 can be manufactured on a second chip, each chip having a different size and a package designed for a different thermal dissipation rate. For example, the second chip can have a larger size than the first chip and a package designed with a specific thermal dissipation rate than the package for first chip due to the AES engines and other decrypting logic in the decrypting device 120. The first chip can have a smaller size due to the absence of AES engines and other decrypting logic. In one embodiment, port processor 114 includes N sub-port processor, where N is the number of input ports (not shown) of device 100. The sub-port processors can be designed to optimize package cost and overall size. Each of the sub-port processors can be "daisy-chained" to access a single data channel for communication between the sub-port processors and the decrypting device. The decrypt engine is used to decrypt one or more of the video data (e.g., V_B), the audio data and the auxiliary data from the selected data frame (e.g., data frame 110B) and to maintain authentication with the corresponding transmitting device (not shown in FIG. 1). The decrypt engine includes AES engines to decrypt one or more of the video data, the audio data and the auxiliary data from the selected data frame.

Discarding one or more of the video data (e.g., V_A through V_N, not including V_B), the audio data and the auxiliary data from the unselected data frames (e.g., 110A through 110N, not including 110B) allows for a link engine to be used for maintaining authentication with the transmitting devices (not shown in FIG. 1) corresponding to the unselected streams. Unlike the decrypt engine, link engines do not include AES engines.

Figure 2A:
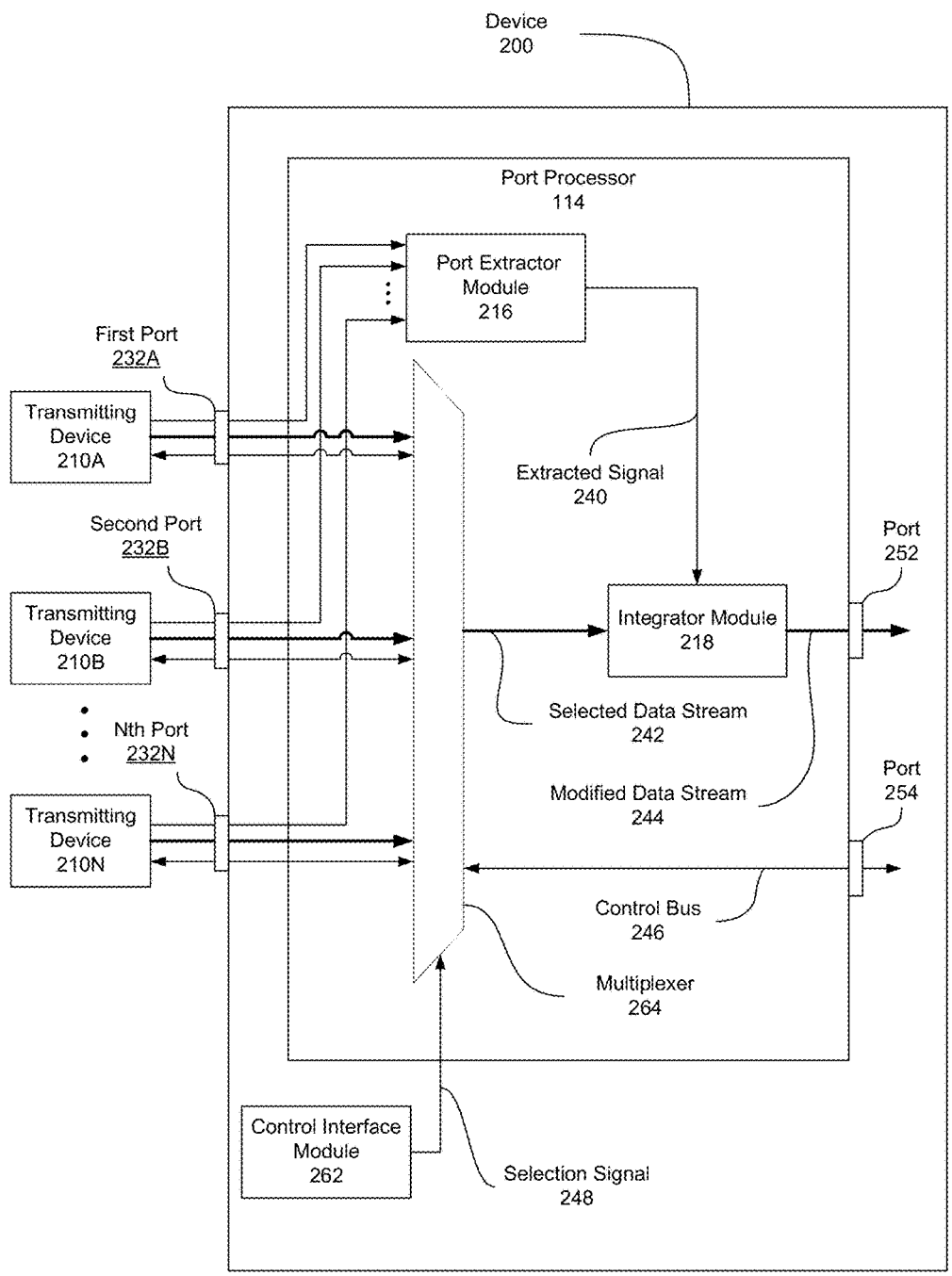
FIG. 2A is a block diagram illustrating a device including a port processor for inserting control data from unselected transmitting devices into a data stream from a selected transmitting device, according to one embodiment.

FIG. 2A is a block diagram illustrating device 200 including port processor 114 for inserting extracted signal 240, including control data from unselected transmitting devices, into selected data stream 242 from a selected transmitting device (e.g., transmitting device 210B), according to on embodiment. The port processor 216 may include, among other components, a port extractor module 216, a control interface module 262, a multiplexer 246, an integrator module, ports 232A through 232N (hereinafter collectively referred to as "ports 232") communicating with transmitting devices 210A through 210N (hereinafter collectively referred to as "transmitting devices 110") and ports 242, 254 communicating with decrypting device 120. The components illustrated in FIG. 2A is merely illustrative and the port processor 216 may include other components such as FIFO buffers for receiving and buffering data for transmission or processing.

Ports 232 receive data streams from transmitting devices 210. After receiving the data streams from transmitting devices 210, multiplexer 264 of port processor 114 selects one of the data streams (e.g., data stream from transmitting device 210B) according to selection signal 248 received from control interface module 262. In one example, control interface module 262 receives data from a source external to device 200 and transmitting devices 210, the received data indicating a transmitting device (e.g., transmitting device 210B) from the plurality of transmitting devices 210. An example of sources external to device 200 and transmitting device 210 includes a remote control. Selection signal 248 from control module 262 indicates selection of a transmitting device (e.g., transmitting device 210B) from the transmitting devices 210.

Multiplexer 264 is software, hardware, firmware or a combination thereof for selecting a data stream 242 among a plurality of data streams received from transmitting devices 210 and maintaining authentication between transmitting devices 210 and decrypting device 120. After selecting a data stream, multiplexer 264 transmits selected data stream 242 corresponding to the data stream from the selected transmitting device to integrator module 218. Selected data stream 242 includes control data and one or more of video data, audio data and auxiliary data for each data frame of the selected data stream (e.g., data stream from transmitting device 210B). Multiplexer 264 also receives authentication requests from transmitting devices 210 and routes authentication data to transmitting devices 120. Multiplexer 264 also discards unselected data streams (e.g., data streams from transmitting devices 210, other than transmitting device 210B) without sending the unselected data streams for further processing.

Port extractor module 216 is software, hardware, firmware or a combination thereof for extracting control data from each frame of each of the unselected data streams (e.g., data streams from transmitting devices 210, other than data stream from transmitting device 210B) and transmitting extracted signal 240 to integrator module 218. Port extractor module 216 includes index information indicating transmitting devices associated with the unselected data streams in extracted signal 240. Extracted signal 240 includes extracted control data from each frame of each of the unselected data streams.

In one embodiment, extracted control data includes vertical synchronization data. In this embodiment, extracted signal 240 is a vertical synchronization signal where the vertical synchronization signal includes vertical synchronization data from the unselected data streams. In another embodiment, extracted control data includes encryption data CTLx, in the EESS protocol used in the MHL or HDMI standard. In this embodiment, extracted signal 240 is an encryption signal where the encryption signal includes encryption data from the unselected data streams. In yet another embodiment, extracted control data includes vertical synchronization data and encryption data and extracted signal 240 includes a vertical synchronization signal and an encryption signal. In this embodiment, HDCP decrypt engine 224 and HDCP link engine 226A through 226M use the encryption data to interpret the vertical synchronization data.

Integrator module 218 is software, hardware, firmware or a combination thereof for inserting extracted signal 240 into selected data stream 242 to generate modified data stream 244. In one embodiment, extracted signal 240 is inserted into unused bandwidth in the control period of selected data stream 242. Unused bandwidth in the control period corresponds to portions of the control period in which there is no audio data and auxiliary data.

Control bus 246 extends between multiplexer 264 and port 254 to carry authentication requests from multiplexer 264 to de-multiplexer 266 and to carry authentication data from de-multiplexer 266 to multiplexer 264.

Ports 252, 254 are hardware components for sending data to and receiving data from decrypting device 120. In one embodiment, selected data stream 242 and modified data stream 244 are transmitted over TMDS channel 118. Modified data stream 244 is transmitted to de-multiplexer 266 of decrypting device 120 from port 252 of port processor 114 to port 256 of decrypting device 120. Authentication requests are transmitted to de-multiplexer 266 of decrypting device 120 from port 254 of port processor 114 to port 258 of decrypting device 120 via control bus 246. Further, authentication data is received at multiplexer 264 at port 254 of port processor 114 from de-multiplexer 266 of decrypting device 120 via control bus 246.

Figure 2B:
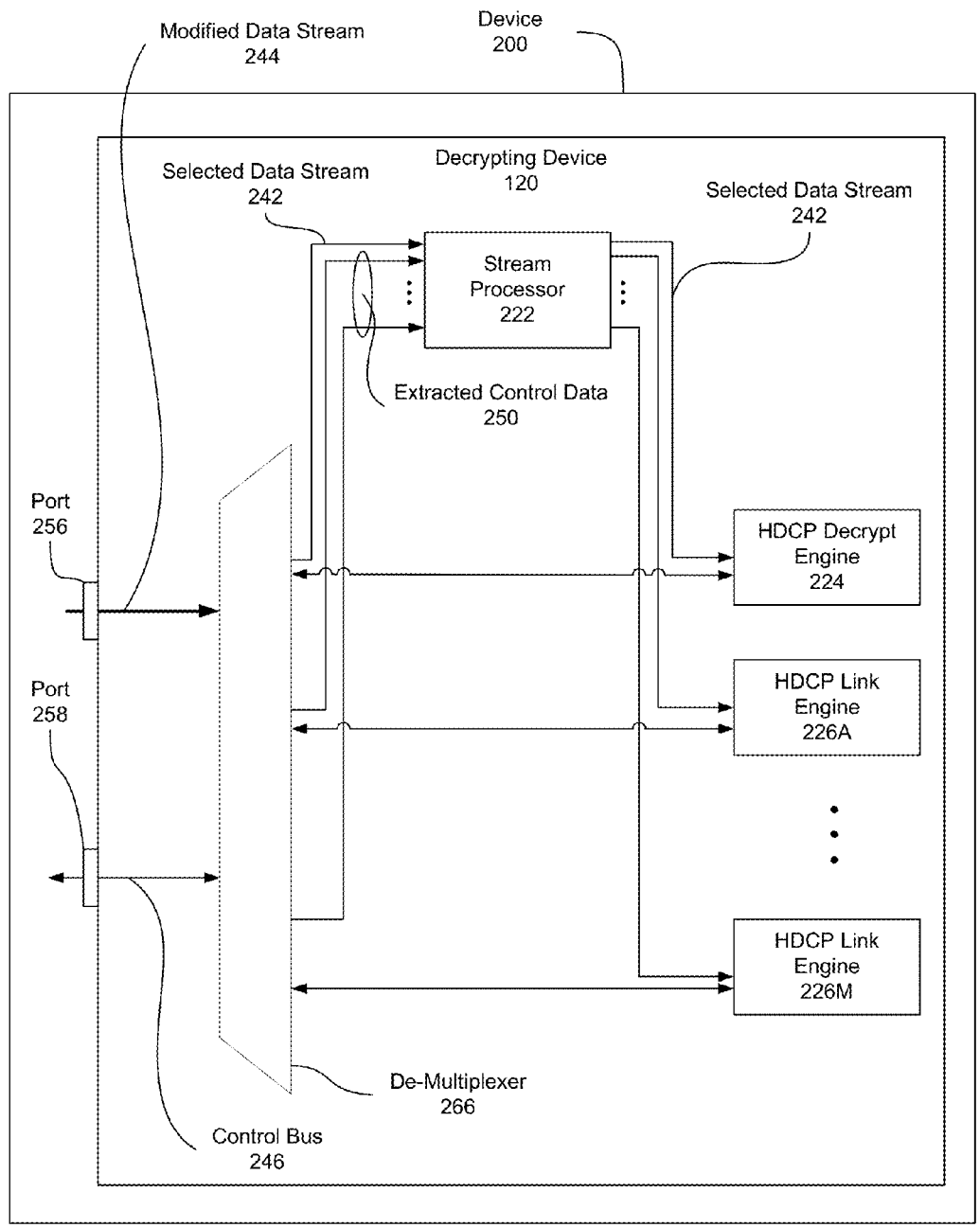
FIG. 2B is a block diagram illustrating a device including a decrypting device for extracting control data for unselected transmitting devices from the received data stream, according to one example.

FIG. 2B is a block diagram illustrating a device 200 including decrypting device 120 for extracting control data from unselected transmitting devices from the received modified data stream 244, according to one embodiment. Decrypting device 120 may include, among other components, ports 256, 258, de-multiplexer 266, a stream processor 222, a HDCP decrypt engine 224 and HDCP link engines 226A through 226M (hereinafter collectively referred to as "HDCP link engines 226").

Ports 256, 258 are hardware components for sending data to and receiving data from port processor 114. Port 256 communicates with port 252 of port processor 114 to receive modified data stream 244. Port 258 communicates with port 254 of port processor 254 to receive authentication requests and to transmit authentication data.

De-multiplexer 266 is software, hardware, firmware or a combination thereof for extracting control data in modified data stream 244 from the out-of-band characters of the control period. De-multiplexer 266 then routes extracted control data 250 and selected data stream 242 to stream processor 222.

Stream processor 222 is software, hardware, firmware or a combination thereof for identifying extracted control data 250 and routing extracted control data 250 to corresponding HDCP link engines 226 according to the index information encoded in extracted control data 250. Stream processor 222 further routes selected data stream 242 to HDCP decrypt engine 224 for decryption of one or more of video data, audio data and auxiliary data and maintaining authentication with corresponding transmitting device (e.g., transmitting device 210B) at port 232 (e.g., port 232B) using control data. Selected data stream 242 includes control data and one or more of video data, audio data and auxiliary data corresponding to the selected data stream (e.g., data stream from transmitting device 210B) selected by port processor 114 according to selection signal 248. The total number of HDCP link engines M may correspond to N−1 where N is the number of input ports 232 of device 200.

HDCP decrypt engine 224 is software, hardware, firmware or a combination there of for decrypting one or more of video data, audio data and auxiliary data of selected data stream 242 to generate one or more of audio and video signals and for processing control data of selected data stream 242 to maintain authentication with corresponding the transmitting device (e.g., transmitting device 210B). HDCP decrypt engine 224 may include, for example, analog phase lock loop (PLL) circuitry, Serializer and Deserializer (SerDes), and other logics for recovering one or more of video data, audio data and auxiliary data from selected data stream 242. HDCP decrypt engine 224 uses control data of selected data stream 242, such as vertical synchronization data and encryption data, to decrypt selected data stream 242.

Each HDCP link engine 226 is software, hardware, firmware or a combination thereof for processing the extracted control data to maintain the authentication status with corresponding transmitting devices 210. HDCP link engines 226 includes logic for processing control data but no additional logic, such as AES engines, for decrypting one or more of video data, audio data and auxiliary data to generate audio and video signals. The extracted control data does not include video data, audio data and auxiliary data of the corresponding unselected data streams. In one example, HDCP link engines 226 use vertical synchronization data as the control data to maintain authentication.

Although multiple HDCP link engines 226 are illustrated in the embodiment of FIG. 2B, a single HDCP link engine may be employed to process control data from different streams. That is, a single HDCP link engine may operate in a time-divisional manner to process control data of different streams.

Figure 3:
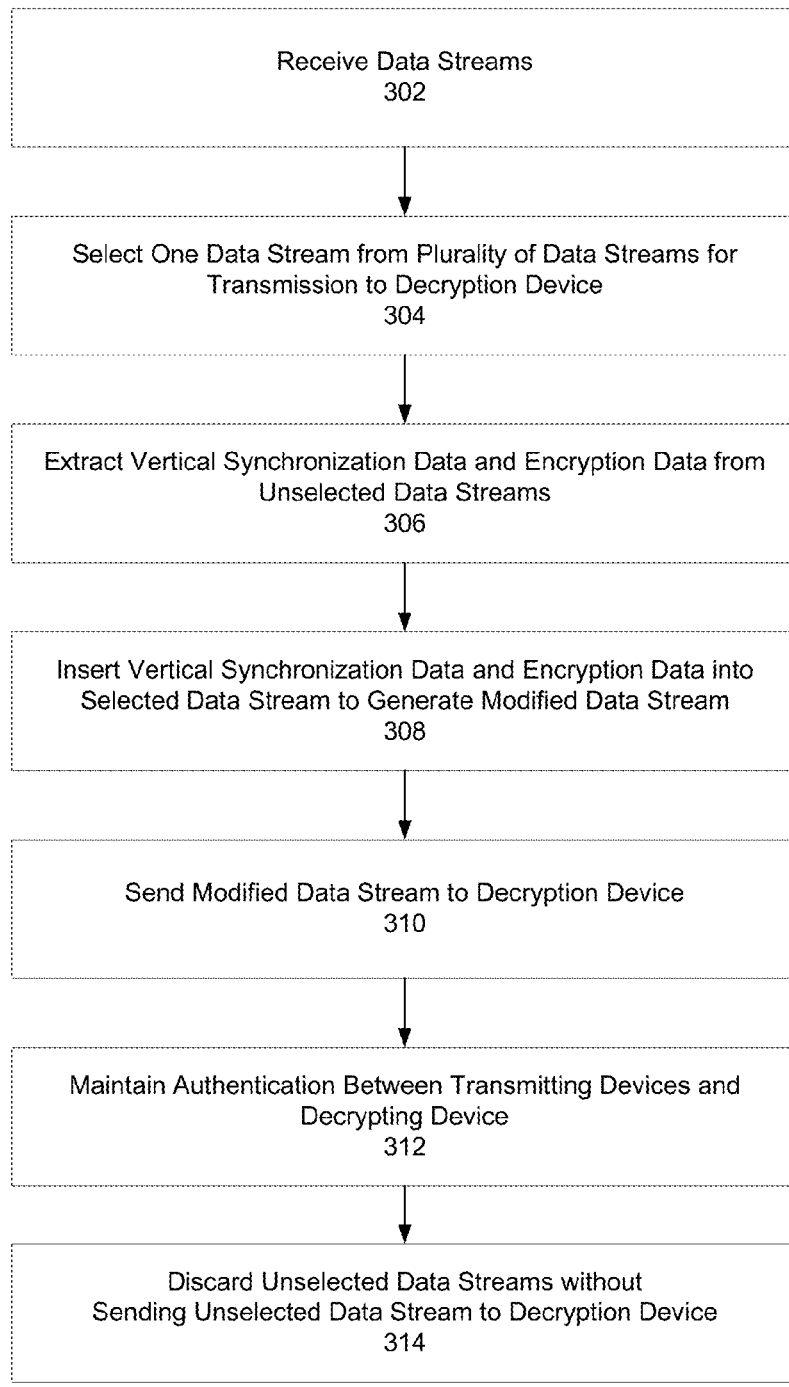
FIG. 3 is a flowchart illustrating a method for routing a selected data stream and vertical synchronization data from transmitting devices to a decrypting device, according to one embodiment.

FIG. 3 is a flowchart illustrating routing of selected data stream 242 and extracted signal 240 including control data from transmitting devices 210 to decrypting device 120 via port processor 114, according to one embodiment. Ports 232 receive 302 data streams from a plurality of transmitting devices 210.

Multiplexer 264 selects 304 one data stream (e.g., data stream from transmitting device 210B) from the plurality of data streams (e.g., data streams from transmitting devices 210) for transmission to decrypting device 120. In one embodiment, multiplexer 264 selects 304 one data stream according to selection signal 248 received from control interface module 262. Port extractor module 216 extracts 306 vertical synchronization data and encryption data from unselected data stream (e.g., data streams from transmitting devices 210 other than selected transmitting device 210B).

Integrator module 218 inserts 308 extracted vertical synchronization data and extracted encryption data into selected data stream 242 to generate modified data stream 244. Integrator module 218 sends 310 modified data stream 244 to de-multiplexer 266 of decrypting device 120 via port 252 of port processor 114.

Multiplexer 264 maintains 312 authentication between transmitting devices 210 and HDCP decrypt engine 224 and HDCP link engines 226 in decrypting device 120. The authentication status of transmitting devices 210 and HDCP decrypt engine 224 and HDCP link engines 226 may be maintained by re-keying. Re-keying refers to multiplexer 264 and transmitting devices 210 updating the shared key used for cipher and decipher of the contents at every frame boundary. For example, at every $128^{th}$ frame, multiplexer 264 and transmitting devices 210 exchange a residue of the key and check the authentication of the link. Multiplexer 264 receives authentication data from de-multiplexer 266 of decrypting device 114 via control bus 246. Authentication data may include, for example, residual key values (Ri values). Multiplexer 264 then routes each residual key value (Ri value) from the Ri values to corresponding transmitting devices 210. The authentication is compliant with High-bandwidth Digital Content Protection (HDCP) standard.

In one embodiment, multiplexer 264 receives an authentication request from a transmitting device (e.g. transmitting device 210A). Multiplexer 264 communicates the authentication request with de-multiplexer 266 via control bus 246. Multiplexer 264 communicates a port index (e.g., port 232A) corresponding to the port the transmitting device requesting authentication is connected to. Multiplexer 264 then receives authentication data associated with the authentication request corresponding to the transmitting device from de-multiplexer 266 via control bus 246. The authentication data may include, for example, an Ri value. Multiplexer 264 stores the received Ri value and exchanges the Ri value with the transmitting device to maintain 312 authentication. In one embodiment, multiplexer 264 stores the received Ri value in a First in First Out (FIFO) queue. Multiplexer 264 exchanges the Ri value in the FIFO queue with the transmitting device to maintain 312 authentication.

Multiplexer 264 discards 314 unselected data streams without sending the unselected data streams to de-multiplexer 266 of decrypting device 120.

Figure 4:
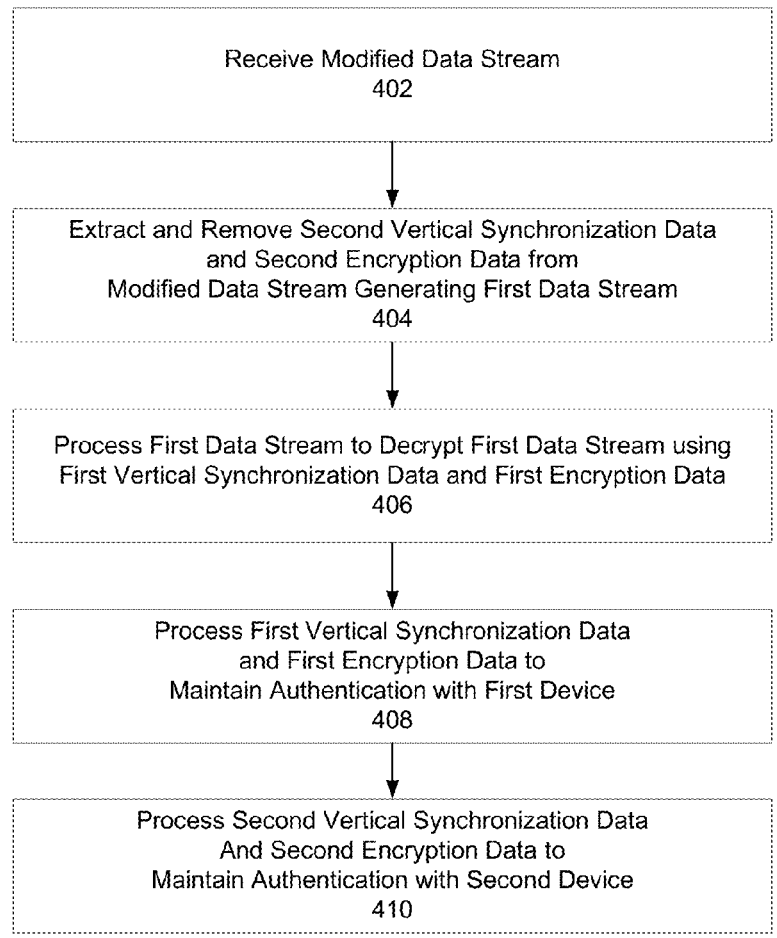
FIG. 4 is a flowchart illustrating maintaining authentication with transmitting devices using vertical synchronization data, according to one embodiment.

FIG. 4 is a flowchart illustrating maintaining the authentication status with transmitting devices 200 using vertical synchronization data, according to one embodiment. De-multiplexer 264 of decrypting device 120 receives 402 modified data stream 244 from integrator module 218 of port processor 114 at port 256 of decrypting device 120. Stream processor 222 extracts 404 and removes 404 second vertical synchronization data and second encryption data from modified data stream 244 to convert the modified data stream 224 into first data stream (e.g., selected data stream 242).

HDCP decrypt engine 224 processes 406 first data stream to decrypt one or more of video data, audio data and auxiliary data of first data stream using first vertical synchronization data and first encryption data of first data stream. HDCP decrypt engine 224 processes 408 first vertical synchronization data and first encryption data to maintain authentication with a first device (e.g., transmitting device 210B). De-multiplexer 266 receives an authentication request corresponding to the first device from multiplexer 264 via control bus 246. De-multiplexer 266 routes the request to HDCP decrypt engine 224.

HDCP decrypt engine 224 processes 408 first vertical synchronization data and first encryption data to generate authentication data. Authentication data may include, for example, an Ri value. HDCP decrypt engine 224 routes the generated Ri value to de-multiplexer 266. De-multiplexer 266 then routes the generated Ri value corresponding to the first device to multiplexer 264 via control bus 246. In one embodiment, HDCP decrypt engine 224 pre-generates Ri values and stores the pre-generated Ri values in FIFO queues. The FIFO queue transmits Ri values as requested by de-multiplexer 266.

A HDCP link engine (e.g., HDCP link engines 226A) processes 410 second vertical synchronization data and second encryption data to maintain authentication with second device (e.g., transmitting device 210A). De-multiplexer 266 receives an authentication request corresponding to the second device from multiplexer 264 via control bus 246. De-multiplexer 266 routes the request to the HDCP link engine.

The HDCP link engine processes 410 second vertical synchronization data and second encryption data to generate authentication data. Authentication data may include, for example, an Ri value. HDCP link engine routes the generated Ri value to de-multiplexer 266. De-multiplexer 266 then routes the generated Ri value corresponding to the second device to multiplexer 264 via control bus 246. In one embodiment, the HDCP link engine pre-generates Ri values and stores the pre-generated Ri values in FIFO queues. The FIFO queue transmits Ri values as requested by de-multiplexer 266.

HDCP decrypt engine 224 and HDCP link engines 226 synchronize residual key values (Ri values) that are used to maintain authentication between transmitting devices 210 and decrypting device 120.

The sequence of steps as described above with reference to FIGS. 3 and 4 are merely illustrative. For example, although discarding 314 unselected data streams is described above with reference to FIG. 3 as occurring after sending 310 modified data stream 244, unselected data streams may be discarded 314 before sending 310 modified data stream. Similarly, although processing 410 second vertical synchronization data and second encryption data is described above with reference to FIG. 4 as occurring after processing 406 first data stream, second vertical synchronization data and second encryption data may be processed 410 before processing 406 first data stream.

Figure 5:
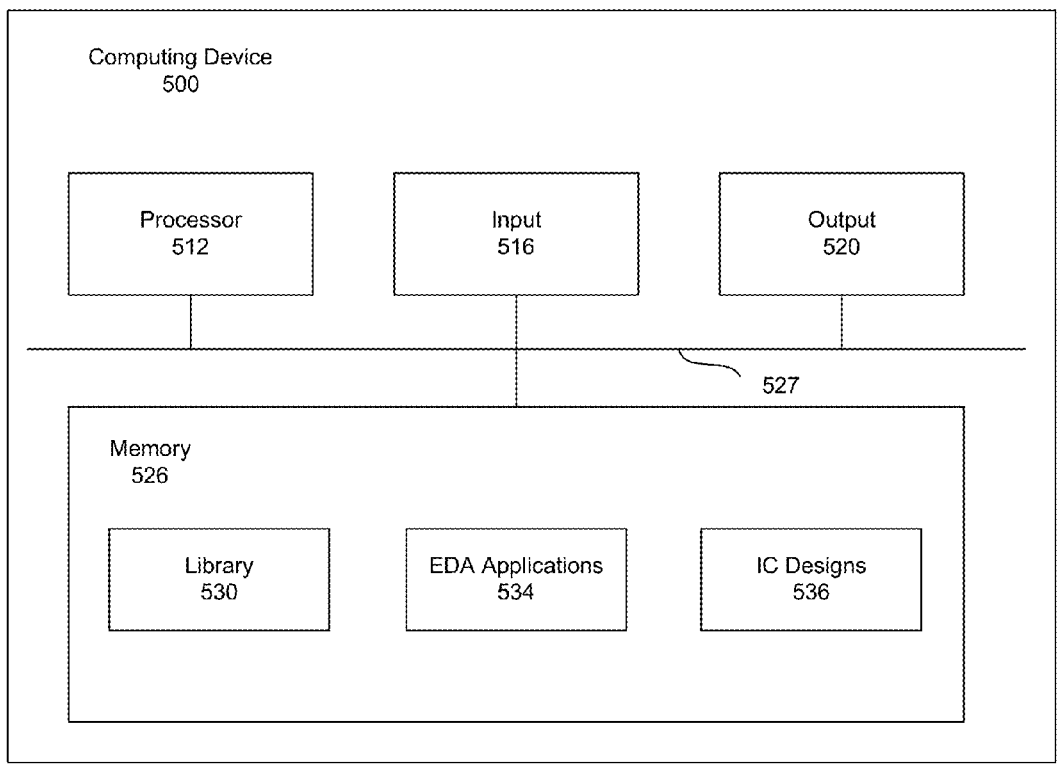
FIG. 5 is a block diagram of a computing device for performing designing operations associated with the port processor and the decrypting device, according to one embodiment.

FIG. 5 is a block diagram of a computing device 500 for performing designing operations associated with HDCP receiver (RX) engine 252 and HDCP transmitter (RX) engines 258A, 258B, according to one embodiment. The computer device 500 may include, among other components, a processor 512, an input module 516, an output module 520, a memory 526 and a bus 527 for connecting these components. The processor 512 executes instructions stored in the memory 526. The input module 516 may include various devices for receiving user input, including keyboards and pointing devices (e.g., mouse and touch screen). The output module 520 includes a display device or interface device for communicating with the display device.

The memory 526 is a non-transitory computer readable storage medium storing, among others, library 530, electronic design automation (EDA) applications 534 and integrated circuit (IC) designs 536. The library 530 may include data on various circuit components, including instances of HDCP receiver (RX) engine 252 and HDCP transmitter (RX) engines 258A, 258B describe herein. The EDA applications 534 may include various software programs for designing ICs, including place and route tools, synthesis tools, and verification tools. The design processed by the EDA applications 534 may be stored in IC designs 536. The IC designs 536 may be an entire operational circuit or a part of a larger IC circuit. The IC designs 536 include one or more port processor 114 and decrypting device 120.

Principles described herein may be used in with protocols other than MHL and/or HDCP. For example, similar embodiments can also be used in HDCP in HDMI 2.0. Thus, while particular embodiments and applications of the present disclosure have been illustrated and described, it is to be understood that the embodiments are not limited to the precise construction and components disclosed herein and that various modifications.

What is claimed is:

1. A method comprising:
   receiving a plurality of data streams from a plurality of transmitting devices;
   selecting one data stream from the plurality of data streams for transmission to a decrypting device;
   extracting vertical synchronization data from unselected one or more data streams;
   inserting the extracted vertical synchronization data into the selected data stream to generate a modified data stream;
   sending the modified stream to a decrypting device including at least one processing engine for decrypting the selected data stream;
   maintaining authentication with transmitting devices sending the one or more unselected streams; and
   discarding the one or more unselected data streams without sending the one or more unselected data streams to the decrypting device.

2. The method of claim 1, further comprising:
   extracting encryption data from the one or more unselected data streams, the encryption data indicating whether data in the one or more unselected data streams is encrypted; and
   inserting the extracted encryption data into the selected data stream to generate the modified data stream.

3. The method of claim 2, wherein the encryption data comprises a control signal for performing Enhanced Encryption Status Signaling (EESS) in Mobile High-Definition Link (MHL) or High-Definition Multimedia Interface (HDMI) standard.

4. The method of claim 2, wherein the vertical synchronization data and the encryption data are inserted into control periods of the selected data stream to generate the modified data stream.

5. The method of claim 1, further comprising authenticating the decrypting device with each of the plurality of transmitting devices by at least sending authentication data from the decrypting device to each of the plurality of transmitting devices.

6. The method of claim 5, wherein the authentication is compliant with High-bandwidth Digital Content Protection (HDCP) standard.

7. The method of claim 6, further comprising:
   receiving Ri values for the plurality of the data streams from the decrypting device; and
   routing Ri values to each of the plurality of transmitting devices.

8. The method of claim 1, further comprising receiving a selection signal, selection of one of the data streams made according to the selection signal.

9. A method comprising:
   receiving a modified data stream from a port processor, the modified encryption data stream including (i) first data stream including content and first vertical synchronization data, and (ii) second vertical synchronization data for second data stream;
   extracting and removing the second vertical synchronization data from the modified data stream to generate the first data stream;
   processing the first data stream by a decryption engine to decrypt the first data stream based on the first vertical synchronization data; and
   processing the extracted vertical synchronization data by a link engine to maintain authentication with a second transmitting device sending the second data stream.

10. The method of claim 9, wherein the modified encryption data stream does not include content of the second data stream, and the link engine does not receive or decrypt the content of the second data stream.

11. The method of claim 10, further comprising extracting and removing encryption data for the second data stream from the modified encrypted data stream to generate the first encrypted data stream.

12. The method of claim 11, wherein the encryption data comprises a control signal for performing Enhanced Encryption Status Signaling (EESS) in Mobile High-Definition Link (MHL) or High-Definition Multimedia Interface (HDMI) standard.

13. The method of claim 9, further comprising
authenticating with a first transmitting device by at least sending first authentication data from the decrypting device to the first transmitting device via the port processor; and
authenticating with the second transmitting device by at least sending second authentication data from the decrypting device to the second transmitting device via the port processor.

14. The method of claim 13, wherein the authentication with the first transmitting device and the authentication with the second transmitting device is compliant with High-bandwidth Digital Content Protection (HDCP) standard.

15. The method of claim 13, further comprising:
sending Ri values for the first data stream to the first transmitting device via the port processor to maintain authentication with the first transmitting device; and
sending Ri values for the second data stream to the second transmitting device via the port processor to maintain authentication with the second transmitting device.

16. A port processor comprising:
a plurality of ports configured to receive a plurality of data streams from a plurality of transmitting devices, one data stream selected from the plurality of data streams for transmission to a decrypting device;
an extraction circuit coupled to the plurality of ports and configured to extract vertical synchronization data from one or more unselected data streams;
a switch circuit coupled to the plurality of ports, the switch circuit configured to pass the selected data stream but block one or more unselected data streams;
an integrator circuit coupled to the switch circuit and configured to insert the extracted vertical synchronization data of the one or more unselected data streams into the selected data stream to generate a modified data stream; and
a communication port coupled to the integrator circuit and configured to send the modified stream to the decrypting device for decrypting the selected data stream in the modified data stream and maintaining authentication with transmitting devices sending the one or more unselected streams.

17. The port processor of claim 16, wherein the port processor is manufactured using a first semiconductor fabrication process and the decrypting device is manufactured using a second semiconductor fabrication process having a smaller critical dimension than the first semiconductor fabrication process.

18. The port processor of claim 16, wherein the extraction circuit is further configured to extract encryption data from the one or more unselected data streams, the encryption data indicating whether data in the one or more unselected data streams is encrypted, and the integrator circuit is further configured to insert the extracted encryption data into the selected data stream to generate the modified data stream.

19. The port processor of claim 18, wherein the vertical synchronization data and the encryption data are inserted into control periods of the selected data stream to generate the modified data stream.

20. The method of claim 1, further comprising a multiplexer circuit configured to authenticate the decrypting device with each of the plurality of transmitting devices by at least sending authentication data from the decrypting device to each of the plurality of transmitting devices.

21. A non-transitory computer-readable storage medium storing instructions thereon, the instructions representing a design of a decrypting device, the decrypting device comprising:
a port configured to receive a modified data stream from a port processor, the modified encryption data stream including (i) first data stream including content and first vertical synchronization data, and (ii) second vertical synchronization data for second data stream;
an extraction circuit configured to extract and remove the second vertical synchronization data from the modified data stream to generate the first data stream;
a decryption engine coupled to the extraction circuit and configured to process the first data stream to decrypt the first data stream based on the first vertical synchronization data; and
a link engine coupled to the extraction circuit and configured to process the extracted vertical synchronization data by a link engine to maintain authentication with a second device sending the second data stream.

* * * * *